US007973489B2

(12) United States Patent  
Lam et al.

(10) Patent No.: US 7,973,489 B2
(45) Date of Patent: Jul. 5, 2011

(54) LIGHTING SYSTEM FOR ILLUMINATION USING COLD CATHODE FLUORESCENT LAMPS

(75) Inventors: Victor Lam, Hong Kong (HK); Ge Shichao, San Jose, CA (US)

(73) Assignee: TBT ASSET Management International Limited, Tortola (VG)

( * ) Notice: Subject to any disclaimer, the term of this patent is extended or adjusted under 35 U.S.C. 154(b) by 209 days.

(21) Appl. No.: 11/934,605

(22) Filed: Nov. 2, 2007

(65) Prior Publication Data

US 2009/0115342 A1 May 7, 2009

(51) Int. Cl.
 *H05B 41/24* (2006.01)
(52) U.S. Cl. .......................... 315/276; 315/57; 315/184
(58) Field of Classification Search ............ 362/184; 315/276, 57
 See application file for complete search history.

(56) References Cited

U.S. PATENT DOCUMENTS

| | | |
|---|---|---|
| 1,870,147 A | 8/1932 | Smally |
| 2,501,375 A | 3/1950 | Breadner et al. |
| 3,253,176 A | 5/1966 | Pate et al. |
| 3,660,839 A | 5/1972 | Wittman |
| 3,812,393 A | 5/1974 | Koo |
| 4,017,758 A | 4/1977 | Almer et al. |
| 4,137,483 A | 1/1979 | Ochi |
| 4,161,020 A | 7/1979 | Miller |
| 4,300,073 A | 11/1981 | Skwirut et al. |
| 4,871,944 A | 10/1989 | Skwirut et al. |
| 5,497,048 A | 3/1996 | Burd |
| 5,561,539 A | 10/1996 | Funahata et al. |
| 5,702,179 A | 12/1997 | Sidwell et al. |
| 5,751,104 A | 5/1998 | Soules |
| 5,775,801 A | 7/1998 | Shaffer |
| 6,011,354 A | 1/2000 | Tsai |
| 6,050,704 A | 4/2000 | Park |
| 6,053,623 A | 4/2000 | Jones |
| 6,054,806 A | 4/2000 | Holzer |
| 6,064,155 A | 5/2000 | Maya |

(Continued)

FOREIGN PATENT DOCUMENTS

CN 1168117 C 9/2004

(Continued)

OTHER PUBLICATIONS

"Compact Fluorescent Lamp", Wikipedia, http://en.wikipedia.org/wiki/Compact_fluorescent_lamp, Dec. 19, 2007, pp. 1-19.

(Continued)

*Primary Examiner* — Douglas W Owens
*Assistant Examiner* — Jae K Kim
(74) *Attorney, Agent, or Firm* — Davis Wright Tremaine LLP

(57) ABSTRACT

A lighting system for illuminating a chamber in a building includes a lighting fixture suitable for being mounted onto a surface of the chamber, so that light emitted by at least one CCFL device mechanically supported by the fixture illuminates the chamber. The one CCFL device includes at least one transformer. A driver adapted to be connected to a surface of the chamber is capable of converting input power from a power source to an AC power having a voltage in the range of about 5-400 volts and a current at a frequency in the range of about 1kc-100 kc. The at least one transformer is suitable for converting the AC power to an output power suitable for operating the at least one CCFL, causing the at least one CCFL to emit light.

28 Claims, 9 Drawing Sheets

U.S. PATENT DOCUMENTS

| | | | |
|---|---|---|---|
| 6,144,170 | A | 11/2000 | Beland et al. |
| 6,211,612 | B1 | 4/2001 | Ge |
| 6,316,872 | B1 | 11/2001 | Ge et al. |
| 6,515,433 | B1 | 2/2003 | Ge et al. |
| 6,633,128 | B2 | 10/2003 | Hyes et al. |
| 6,672,733 | B2 | 1/2004 | Nagatani |
| 6,674,250 | B2 | 1/2004 | Cho et al. |
| 6,762,559 | B1 | 7/2004 | Ishikawa |
| 6,765,633 | B2 | 7/2004 | Eom |
| 6,793,370 | B2 | 9/2004 | Moon et al. |
| 6,879,114 | B2 | 4/2005 | Jales et al. |
| 7,141,933 | B2 | 11/2006 | Ball |
| 7,198,389 | B1 | 4/2007 | Kwong et al. |
| 7,205,712 | B2 | 4/2007 | Yan |
| 7,258,475 | B2 | 8/2007 | Kurumatani |
| 7,309,964 | B2 | 12/2007 | Wey |
| 7,357,528 | B2 | 4/2008 | Marsh |
| 2002/0017866 | A1 | 2/2002 | Lee |
| 2002/0163529 | A1 | 11/2002 | Evanicky |
| 2003/0015957 | A1 | 1/2003 | Ge et al. |
| 2003/0179577 | A1 | 9/2003 | Marsh |
| 2003/0201967 | A1* | 10/2003 | Yu ................................ 345/102 |
| 2003/0223230 | A1 | 12/2003 | Li |
| 2004/0095791 | A1 | 5/2004 | Huang et al. |
| 2004/0129894 | A1 | 7/2004 | Coulombe et al. |
| 2004/0130252 | A1 | 7/2004 | Ge |
| 2004/0184269 | A1 | 9/2004 | Walton |
| 2004/0240202 | A1 | 12/2004 | Sauska et al. |
| 2004/0257793 | A1 | 12/2004 | Wakabayashi |
| 2005/0036315 | A1 | 2/2005 | Marsh |
| 2005/0104522 | A1 | 5/2005 | Yabuki et al. |
| 2005/0141151 | A1 | 6/2005 | Azodi |
| 2005/0162089 | A1 | 7/2005 | Iida et al. |
| 2005/0174769 | A1 | 8/2005 | Yong et al. |
| 2005/0184684 | A1 | 8/2005 | Matsushima et al. |
| 2005/0218808 | A1 | 10/2005 | Hsu |
| 2005/0219647 | A1 | 10/2005 | Lee et al. |
| 2005/0265023 | A1 | 12/2005 | Scholl |
| 2005/0265025 | A1 | 12/2005 | Jang et al. |
| 2005/0275351 | A1 | 12/2005 | Ge |
| 2005/0285476 | A1 | 12/2005 | Chou et al. |
| 2006/0023470 | A1 | 2/2006 | Chen et al. |
| 2006/0028921 | A1 | 2/2006 | Wang et al. |
| 2006/0072311 | A1 | 4/2006 | Tseng et al. |
| 2006/0245213 | A1 | 11/2006 | Beil et al. |
| 2006/0256244 | A1 | 11/2006 | Jak et al. |
| 2006/0273731 | A1* | 12/2006 | Ge .................................. 315/57 |
| 2007/0041182 | A1* | 2/2007 | Ge et al. ........................ 362/184 |
| 2007/0103089 | A1 | 5/2007 | Fregoso |
| 2008/0049434 | A1* | 2/2008 | Marsh ........................... 362/377 |

FOREIGN PATENT DOCUMENTS

| | | | |
|---|---|---|---|
| CN | | 1725430 | 1/2006 |
| DE | | 195 48 325 A1 | 6/1997 |
| EP | | 1 263 020 A2 | 12/2002 |
| FR | | 837 795 A | 2/1939 |
| GB | | 984667 | 3/1965 |
| JP | | 01 173537 | 7/1989 |
| JP | | 05 108776 | 4/1993 |
| JP | | 05 347084 | 12/1993 |
| JP | | 06 059590 | 3/1994 |
| JP | | 07-01453 | 1/1995 |
| JP | | 10-189259 | 5/1995 |
| WO | | WO 01/20642 A1 | 3/2001 |
| WO | | WO 03/083896 | 10/2003 |
| WO | | WO 2005/078763 A2 | 4/2005 |
| WO | | WO 2005/078763 A3 | 8/2005 |
| WO | | WO 2007/012087 A2 | 1/2007 |
| WO | | WO 2007/012087 A3 | 5/2007 |

OTHER PUBLICATIONS

"FAQ's: Compact Fluorescent: GE Commercial Lighting Products", http://www.gelighting.com/na/business_lighting/faqs/cfl.htm; Dec. 19, 2007, pp. 1-5.

Samuel M. Goldwasser and Donald L. Klipstein "Compact Fluorescent Lamps" http://members.misty.com/don/cf.html, Dec. 19, 2007, pp. 1-3.

USPTO, "Office Action," mailed in related U.S. Appl. No. 11/458,924 on May 15, 2008, 41 pages.

USPTO, "Office Action," mailed in related U.S. Appl. No. 11/055,536 on May 30, 2008, 49 pages.

R. Y. Pai, "Efficiency Limits for Fluorescent Lamps and Application to LCD Backlighting", Journal of the SID, May 4, 1997, pp. 371-374.

L. E. Tannas, Jr., "Flat Panel Displays and CRTs", Von Nostrand Reinhold, New York, 1985, pp. 339.

U.S. Office Action corresponding to U.S. Appl. No. 11/055,536 on Sep. 26, 2007, 23 pages.

H. Noguchi, "A 50,000-hour Lifetime Cold-Cathode Fluorescent Lamp for LCD Backlighting," Harrison Electric Co., Ltd. Ehime, Japan, SID 99 Digest, 1999, pp. 908-911.

USPTO, "Office Action," mailed in related U.S. Appl. No. 11/055,536 on Oct. 8, 2008, 40 pages.

USPTO, "Office Action," mailed in related U.S. Appl. No. 11/458,924 on Dec. 8, 2008, 31 pages.

USPTO, "Office Action" mailed in related U.S. Appl. No. 11/422,320 on Apr. 7, 2009, 20 pages.

PCT "Notification of Transmittal of the ISR and Written Opin of the ISA," mailed Apr. 21, 2009, in related International Application No. PCT/US2008/082145 10 pages.

USPTO, Final Office Action mailed in related U.S. Appl. No. 11/055,536 on May 12, 2009, 27 pages.

USPTO, "Office Action" mailed in related U.S. Appl. No. 11/458,924 on Sep. 18, 2009, 38 pages.

USPTO, "Office Action" mailed in related U.S. Appl. No. 11/055,536 on Oct. 5, 2009, 50 pages.

USPTO, "Office Action," mailed in related U.S. Appl. No. 11/055,536 on Oct. 5, 2009, 50 pages.

USPTO, "Office Action," mailed in related U.S. Appl. No. 11/055,536 on May 14, 2010, 45 pages.

USPTO, "Office Action," mailed in related U.S. Appl. No. 11/458,924 on Apr. 16, 2010, 31 pages.

USPTO, "Office Action," mailed in related U.S. Appl. No. 11/422,320 on July 9, 2010, 18 pages.

Office Action for U.S. Appl. No. 11/422,320 mailed Dec. 27, 2010, 20 pages.

* cited by examiner

LIGHTING SYSTEM FOR ILLUMINATION USING COLD CATHODE FLUORESCENT LAMPS

CROSS-REFERENCE TO RELATED APPLICATIONS

The present application is related to U.S. application Ser. No. 11/055,536, filed Feb. 9, 2005, U.S. application Ser. No. 11/422,320, filed Jun. 5, 2006, and U.S. application Ser. No. 11/458,924, filed Jul. 20, 2006, each of which is hereby incorporated herein, in its entirety, by this reference.

BACKGROUND OF THE INVENTION

This invention relates in general to gas discharge fluorescent devices, and in particular to a cold cathode fluorescent lamp (CCFL) system that is particularly versatile and useful for illumination applications, such as for illuminating a chamber in a building.

CCFL illumination systems are advantageous over hot cathode fluorescent lamps (HCFL) for many reasons and operates using mechanisms that are different from HCFL. The differences between CCFL systems and HCFL systems are explained in more detail in United States Patent Application Publication U.S. 2005/0275351 which is incorporated herein by reference.

As the world enters a period where energy costs will continually increase for the foreseeable future it is imperative to reduce the amount of energy that is consumed by lighting. As known to those skilled in the art, incandescent lighting is notoriously inefficient for lighting purposes. While HCFLs have been widely used to replace incandescent lamps for lighting purposes, the HCFLs are not as flexible as compared to CCFL lighting systems. For example, it may be difficult or impossible to adjust the intensity of light emitted by HCFL lighting systems for different lighting requirements, such as in a dimming operation. It is therefore desirable to provide an improved lighting systems, such as ones using CCFLs, which have better characteristics and flexibility compared to prior lighting systems.

One of the problems encountered in CCFL lighting systems is the fact that heat sensitive electronic components in the CCFL lighting system can be adversely affected by the heat generated by the CCFL lighting element itself and the lifetime of these electronic components may be reduced, thereby also reducing the useful life of the CCFL lighting system. Another problem encountered when CCFLs are used for general lighting is the need to include a converter for converting power from utility power line. This renders the CCFL device bulky and hard to use for lighting purposes, such as in lighting fixtures. It is therefore desirable to provide an improved CCFL lighting system where the above-described disadvantages are avoided or alleviated.

SUMMARY OF THE INVENTION

To alleviate the problem described above, in one embodiment of the invention, the electronics supplying power to the CCFL devices may be separated into two parts that are spaced apart, so that the heat generated by the CCFL devices do not substantially adversely affect the part of the electronics that is spaced apart from the devices. In this manner, the useful life of this part of the electronics is enhanced which may enhance the useful life of the lighting system. Separating the electronics into two parts also allows the portion of CCFL device that emits light to be reduced in size, which makes the CCFL system much more versatile for different applications.

According to one embodiment of the invention, a lighting system is used for illuminating a chamber in a building where the chamber has a number of surfaces. At least one lighting fixture suitable for being mounted on a surface of the chamber mechanically supports at least one CCFL and at least one transformer when the lighting fixture is mounted onto the surface of the chamber. In this manner, light emitted by the at least one CCFL illuminates the chamber. A driver or controller adapted to be connected to a surface of the chamber is capable of converting input power from a power source to an AC power having a voltage in the range of about 5 to 400 volts and at a frequency in the range of about 1 to 100 kilohertz. The at least one transformer converts the AC power to an output power suitable for operating the at least one CCFL, causing the CCFL to emit light. In one implementation, in addition to the at least one transformer, one inductor and one capacitor are also included and are supported by the at least one lighting fixture.

With the above design, it is possible to physically separate the driver or controller from the at least one CCFL device, thereby reducing the adverse effects of heat generated by the at least one CCFL device on the driver or controller and increasing the useful life of the CCFL lighting system. Since one driver or controller can be used to control and power more than one CCFL device, the cost of the CCFL lighting system is also reduced.

Also, since it is possible for the bulk of the electronics (such as that in the driver or controller) to also be removed from the vicinity of the at least one CCFL device, the at least one CCFL device can be made into relatively smaller form factor, which will render the at least one CCFL device much more useful and versatile. In one implementation of this embodiment, the at least one CCFL device can be very similar in size to the conventional incandescent bulbs or conventional HCFL devices, and will fit nicely into the conventional lighting fixtures designed originally for incandescent bulbs or for conventional HCFL devices.

In another embodiment of the invention, a lighting system comprises a plurality of fixtures and a plurality of sets of CCFL devices, each set including at least two CCFL devices. Each set of CCFL devices is supported by a corresponding one of the plurality of fixtures. Each of the CCFL devices comprises at least one CCFL and at least one transformer, and preferably one inductor and/or one capacitor. The at least one transformer in each of the CCFL devices is suitable for converting AC power having a voltage in the range of 5 to 400 volts at a frequency in the range of about 1 to 100 kilohertz to an output power suitable for operating the at least one CCFL in such CCFL device. This causes the at least one CCFL to emit light. The lighting system further comprises at least one controller supplying voltages in the range of about 5 to 400 volts at frequencies in the range of about 1 to 100 kilohertz to the plurality of sets of CCFL devices to cause them to emit light. The at least one controller is capable of supplying different voltages or currents to at least two CCFL devices in at least one of the plurality of sets of CCFL devices. The at least two CCFL devices in such at least one set comprises CCFLs with phosphors of different color temperatures. This enables the lighting system to provide adjustable color temperature lighting.

One impediment in adopting a CCFL-based lighting system may be the need to replace existing wiring and lighting fixtures that are adapted for incandescent lamps or HCFLs. This concern can be alleviated by the following method in one embodiment by using CCFL devices having suitable connectors. This method may be applied to a lighting system designed for a configuration where one or more incandescent lamp or HCFL is supported by at least one lighting fixture mounted onto a surface of a chamber in a building where the at least one lighting fixture includes at least one conventional socket for an incandescent lamp or HCFL. The lighting system may also include electrical lines and a switch or controller controlling a voltage or current supplied to the at least one conventional socket through the electrical lines.

This method employs CCFL devices that may be electrically and mechanically connected to the at least one conventional socket in place of an incandescent lamp or HCFL where each of the CCFL devices comprises a connector that fits into the at least one conventional socket for electrically and mechanically connecting the CCFL to the socket. Each of the CCFL devices also comprises a transformer suitable for converting AC power having a voltage in the range of about 5 to 400 volts at a frequency in the range of about 1 to 100 kilohertz to an output power suitable for operating the CCFL, causing the CCFL to emit light. This method comprises electrically and mechanically connecting to said at least one conventional socket a CCFL device. A driver or controller is installed onto or connected to a surface of the chamber in the building where the driver or controller is suitable for converting input power from a power source such as a utility power line to the AC power. The driver or controller is then connected to the power source for converting input power from the power source to the AC power. In this manner, there is no need to alter the conventional lighting system, such as by replacing the electrical lines or the lighting fixture. In one implementation of this embodiment, the driver or controller suitable for converting input power from a power source such as a utility power line to the AC power may be installed in the existing power junction box which is used to house the existing ON/OFF switch or dimmer of the existing lighting circuit with existing lighting fixtures.

Besides using the CCFL system to accommodate a conventional lighting fixture or lighting system as in the embodiments above, according to further embodiments, the CCFL system can also be used as a dedicated lighting fixture with build in CCFL devices. Where an entirely new lighting system is to be installed for example, such as in a new building, or during remodeling, there is no need to adapt the CCFL system to accommodate a conventional lighting fixture or lighting system. In such event, the lighting system includes at least one lighting fixture designed to mechanically support at least one CCFL and at least one transformer when the lighting fixture is mounted onto a surface of a chamber in a building. In this alternative embodiment, a driver or controller is connected to a surface of the chamber and is caused to convert input power from a power source to AC power comprising a voltage in the range of about 5 to 400 volts at a frequency in the range of about 1 to 100 kilohertz. The driver or controller is connected to the at least one transformer, which then converts the AC power to an output power suitable for operating the at least one CCFL, causing the CCFL to emit light for illuminating the chamber. In this case, it is no longer a CCFL device plugged into a conventional lighting fixture; preferably the CCFL device comes with the lighting fixture as a single unit, the CCFL device and the lighting fixture forming a unitary structure. This makes the lighting fixture systems using CCFL devices easy to install and use.

As an additional feature in the above method, the at least one lighting fixture may also be mounted onto a surface of the chamber in the building so that at least one lighting fixture mechanically supports the at least one CCFL and the at least one transformer.

In yet another alternative embodiment, where a plurality of fixtures are mounted onto a surface of a chamber in a building supporting a plurality of sets of CCFL devices, the CCFL devices may be used to emit light for lighting and illuminating the chamber. Each set of CCFL devices includes at least two CCFL devices each comprising CCFLs with phosphors of different color temperatures. Each of the sets of CCFL devices is supported by a corresponding fixture of a plurality of fixtures. Each of the CCFL devices comprises at least one CCFL and at least one transformer. In a method technique of such embodiment, input power from a power source is converted to AC power comprising one or more voltages in the range of about 5 to 400 volts at a frequency or frequencies in the range of about 1 to 100 kilohertz. The AC power is then supplied separately to at least two CCFL devices in one of the sets of CCFL devices, so that different voltages or currents are supplied to such CCFL devices. The at least one transformer in each of the at least two CCFL devices in such one set is suitable for converting the AC power supplied thereto to an output power suitable for operating CCFLs, causing the at least one CCFL in such CCFL device to emit light. Voltages or currents supplied to the at least two CCFL devices in such one set are controlled separately to provide adjustable color temperature lighting.

In yet another embodiment of the invention, a lighting system comprises a fixture, at least one set of at least two CCFL devices supported by such fixture, each of the CCFL devices comprising at least one transformer and at least one CCFL. The at least one transformer in each of the CCFL devices is suitable for converting AC power comprising a voltage in the range of about 5 to 400 volts at a frequency in the range of about 1 to 100 kilohertz to an output power suitable for operating the at least one CCFL in such CCFL device, causing the at least one CCFL to emit light. The lighting system also includes at least one controller not supported by the fixture where the controller is capable of converting input power from a power source to the AC power. The at least one controller is capable of supplying the AC power separately to the at least two CCFL devices in the at least one set so that different voltages or currents are supplied to the at least two CCFL devices to provide adjustable color temperature lighting.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

Identical components in this application are labeled by the same numerals.

DETAILED DESCRIPTION OF EXEMPLARY EMBODIMENTS

Figure 1:
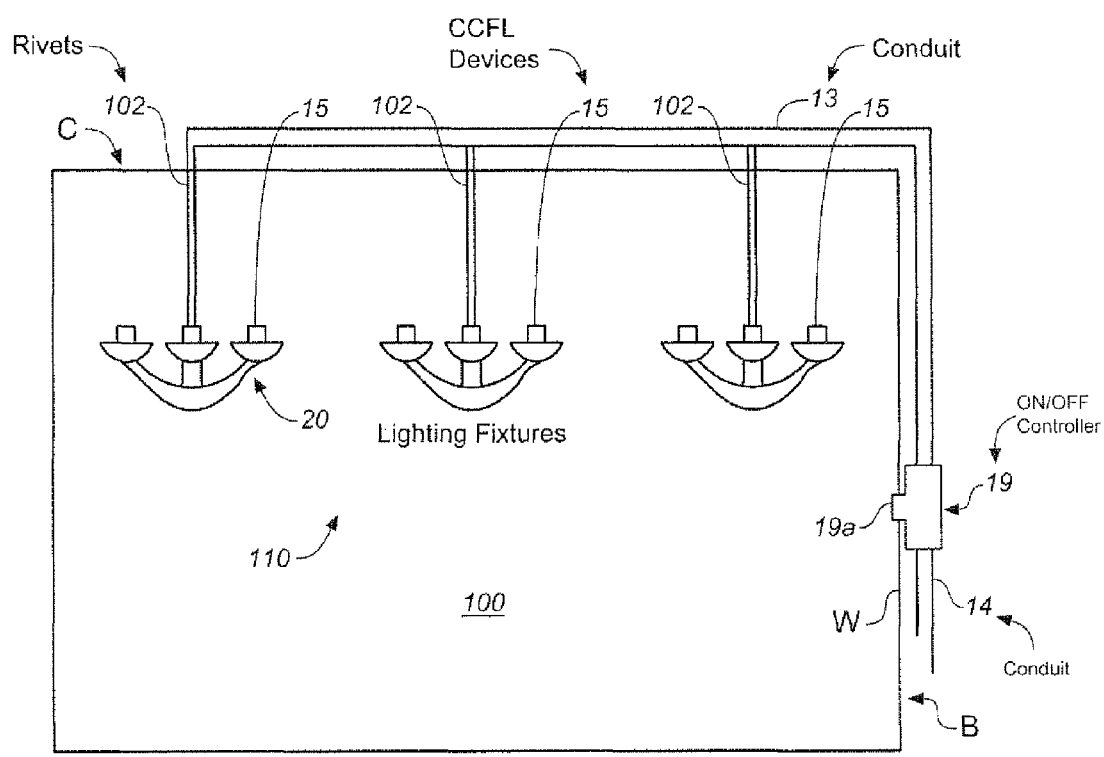
FIG. 1 illustrates a lighting system illuminating a chamber in a building useful for illustrating one embodiment of the invention.
Figure 2:
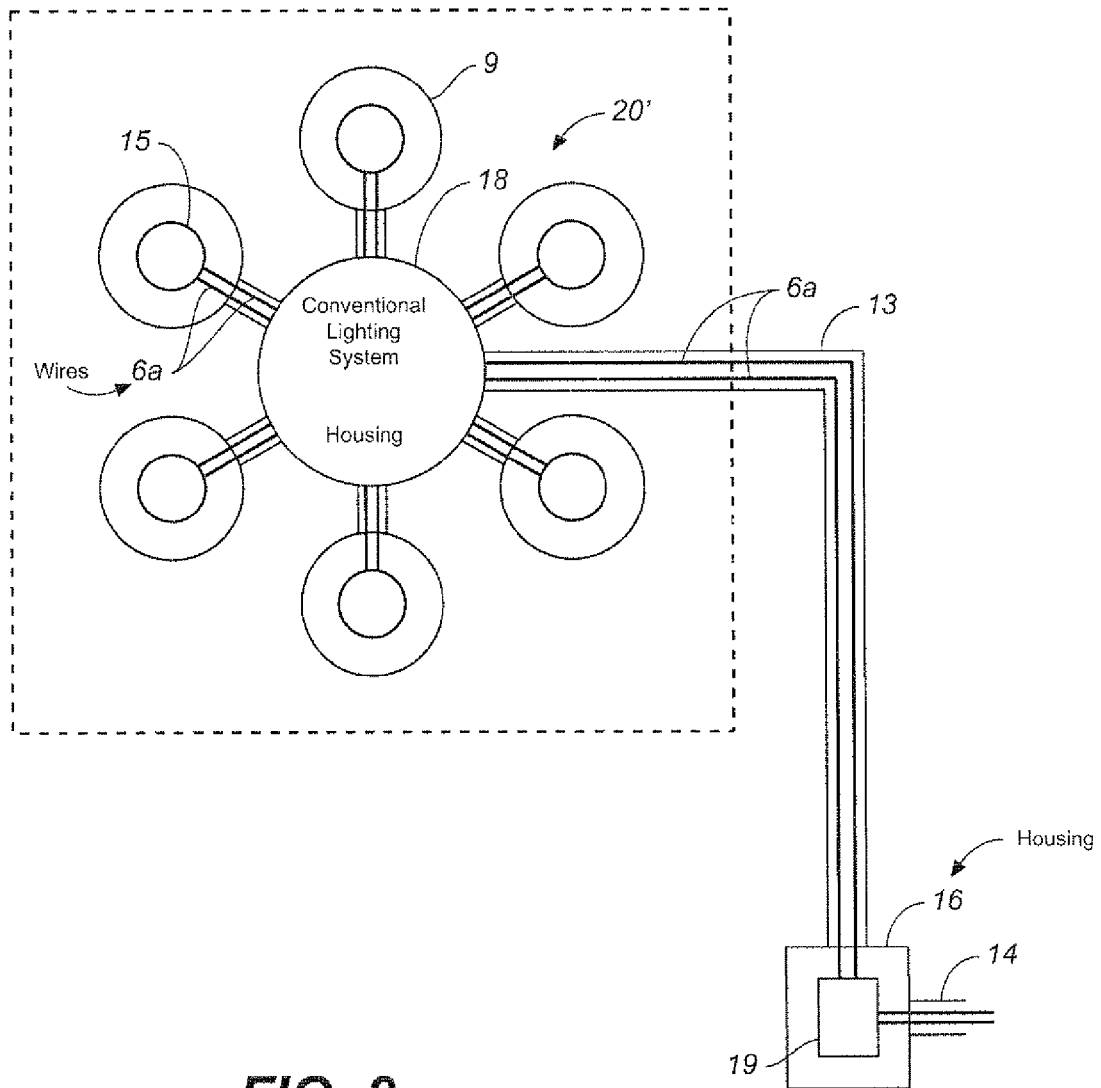
FIG. 2 illustrates a lighting system employing conventional lighting fixtures with multiple conventional lamp sockets each with its own lamp housing which has been adapted for use with CCFL lamps to illustrate one implementation of the embodiment of FIG. 1, where a lighting system designed for use with incandescent lamps may be converted into one using CCFLs.

FIG. 1 illustrates a lighting system illuminating a chamber in a building useful for illustrating one embodiment of the invention. As shown in FIG. 1, a plurality of lighting fixtures 20 are mounted and hung from the ceiling C of a chamber 100 of a building B by a conventional means such as screws or rivets or eyelets 102 (not shown in detail). A building is any man-made structure used or intended for supporting or sheltering any use or continuous (human) occupancy. A lighting fixture is an electrical device used to create artificial light or illumination in a building. While three fixtures are shown in FIG. 1, it will be understood that fewer or more fixtures may be used, as illustrated in FIG. 2, which illustrates a particular implementation of the embodiment of FIG. 1. Each fixture 20 may hold and support one or more CCFL devices 15. Power is conveyed to the CCFL devices 15 by power or electrical lines 6a (shown in FIG. 2 but not in FIG. 1) in conduit 13 (e.g. one made of metal, and in some PVC or polyvinylchloride) from a controller 19. Preferably, controller 19 is placed into the conventional power junction box 16 shown in FIG. 2 (not shown in FIG. 1) behind wall W, which junction box is designed to hold and support a conventional ON/OFF lighting switch or lighting dimmer. Controller 19 has a user interface 19a such as buttons or knobs for adjusting the brightness and for turning the lighting on or off. Conduit 14 carries 110V/220V, 50 Hz/60 Hz AC power into the power junction box holding controller 19 and another conduit 13 brings wires 6a that will distribute power to the rest of the lighting circuit (e.g. CCFL devices 15) controlled by this power junction box. The junction box and its connecting conduits 13 and 14 are all hidden behind the wall W, or can be placed above the ceiling C and controlled remotely as described below. Portions of conduits 13 are hidden behind the ceiling C and wall W. The junction box is adapted to be mounted onto a chamber surface, by means such as screws. In other words, controller 19 is placed into junction box in place of or to replace a conventional ON/OFF lighting switch or lighting dimmer.

Controller 19 receives electric power, such as power at 50 or 60 Hz and 110 or 220 volts, from a power source such as utility power lines in conduit 14. Controller 19 is capable of and converts such power to an AC power (or AC signal, or AC power signal), having a voltage in the range of about 5 to 400 volts at a frequency in the range of about 1 to 100 kilohertz. Since the load driven by the controller has a substantially constant electrical resistance, the current supplied by the controller 19 is substantially proportional to the voltage supplied by it, so that the current supplied by the controller 19 also varies at a frequency in the range of about 1 to 100 kilohertz. This AC power is supplied to the CCFL devices 15. Devices 15 each includes a transformer and a CCFL, where the transformer converts the AC power received to an output power (or output signal, or output power signal) suitable for powering the CCFL, such as a voltage of 2,000 to 10,000 volts, and a voltage comprising voltage pulses at a frequency in the range of about 1 to 100 kilohertz. Controller 19 preferably is capable of converting power in a range of 100 Watts to 200 Watts, when it is housed in a conventional junction box for residential applications. When controller 19 is used in commercial applications to control larger numbers of CCFL devices in each lighting circuit, it is preferably capable of converting power in a range of 100 W~2000 W, and controller 19 is preferably installed next to the lighting circuit behind the ceiling or wall. Multiple controllers 19 driving the CCFL devices can be controlled by a single intelligent controller.

Controller 19 is preferably connected to and supported by a surface (such as ceiling or wall) of chamber 100 so that it is physically separated from the CCFL devices 15 by a distance such that its operation and useful life are not affected by heat generated by the CCFL devices. In one embodiment, controller 19 is located not more than 1 foot from the CCFL devices. In this manner the controller 19 is not or less affected by heat generated by the devices 15. This increases the life time of the controller 19. In contrast, conventional CCFL devices include controllers for converting power from utility power lines in the vicinity of the CCFLs, so that heat generated by the CCFLs adversely affects and reduces the useful life of the controllers and hence of the CCFL devices themselves. As shown in FIG. 1, the controller 19 is located physically separated by at least one foot from the CCFL devices 15 supported by fixtures 20.

Another advantage of the lighting system 110 illustrated in FIG. 1 is that a single controller 19 may be used to supply power to a number of CCFL devices, thereby reducing the cost of system 110. Furthermore, by designing the CCFL system such that controller 19 is separated from the CCFL and the transformer, when the CCFL and transformer become defective or the controller become defective, only the defective part or parts need to be replaced, again reducing the cost of maintenance of system 110 compared with conventional CCFL systems. In addition, by locating a large part of the electronics for driving the CCFL apart from the CCFL device, it is possible to reduce the overall size of the CCFL device (which includes the CCFL and transformer) to a size suitable for replacing conventional light sources such as incandescent lamps or other smaller light sources.

FIG. 2 illustrates a portion of a lighting system employing conventional lighting fixtures 20' with multiple conventional lamp sockets (not shown) for incandescent lamps each with its own lamp housing which has been adapted for use with CCFL lamps to illustrate one implementation of the embodiment of FIG. 1. FIG. 2 also illustrates how a lighting system designed for use with incandescent lamps may be converted into one using CCFLs. As shown in FIG. 2, electrical lines 6a in conduit 13 are connected to connectors (not shown) in a wiring compartment 18 of the conventional lighting fixture 20'. These connectors enable the AC power on lines 6a in conduit 13 to be connected to the six CCFL devices 15 supported by fixture 20' when the fixture is mounted to ceiling C as shown in FIG. 1. The CCFL devices 15 are housed within portions 9 of the conventional lighting fixture 20'. Controller 19 may be housed in a controller housing 16. As noted above, housing 16 located behind wall W can be the conventional power junction box used to house the conventional ON/OFF switch or dimmer for the conventional lighting fixture with multiple lamp sockets.

Figure 3A:
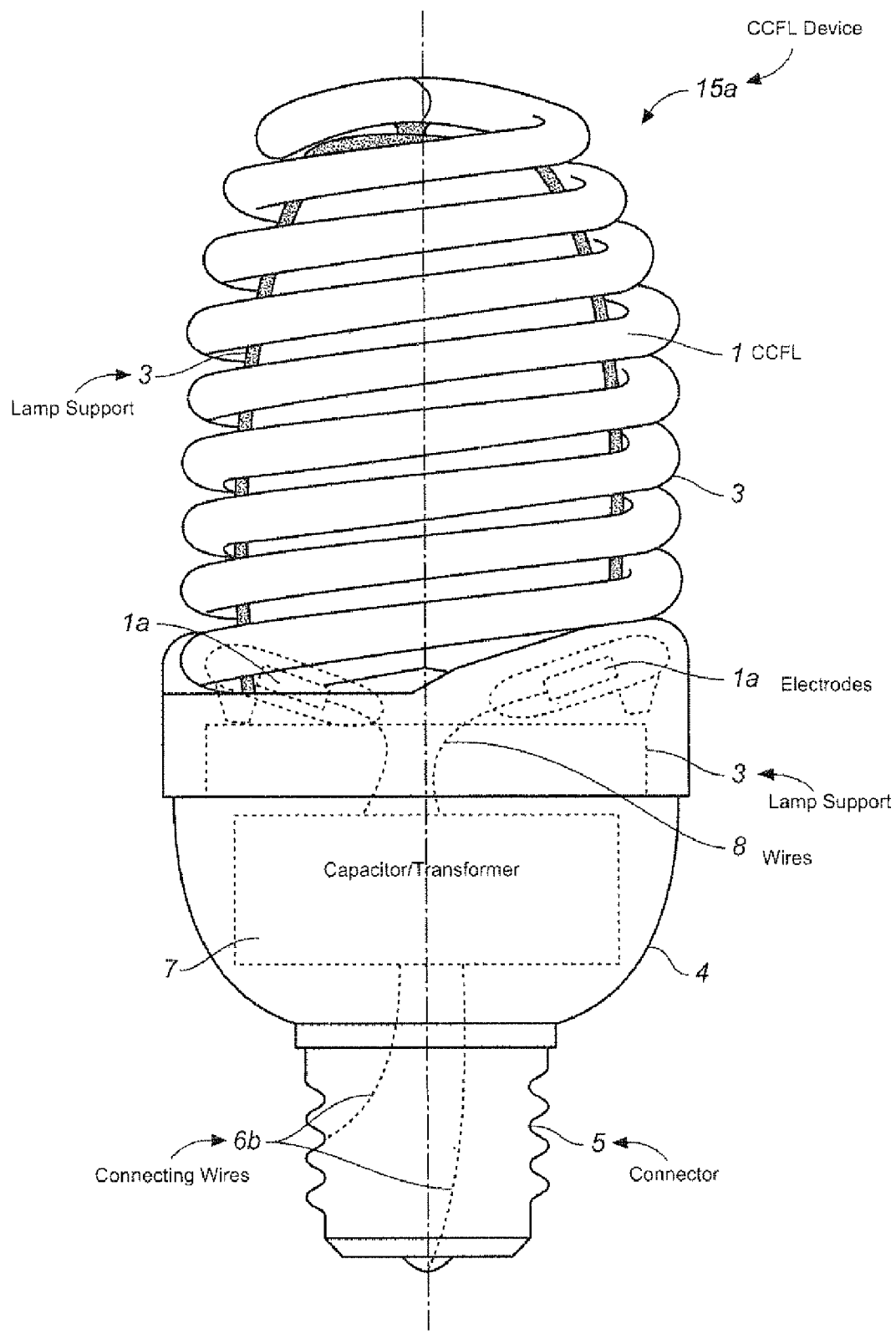
FIGS. 3A and 3B are perspective views of CCFL lamps with drivers and conventional lamp connectors that may be used to replace incandescent lamps to illustrate the embodiment of FIGS. 1 and 2.
Figure 3B:
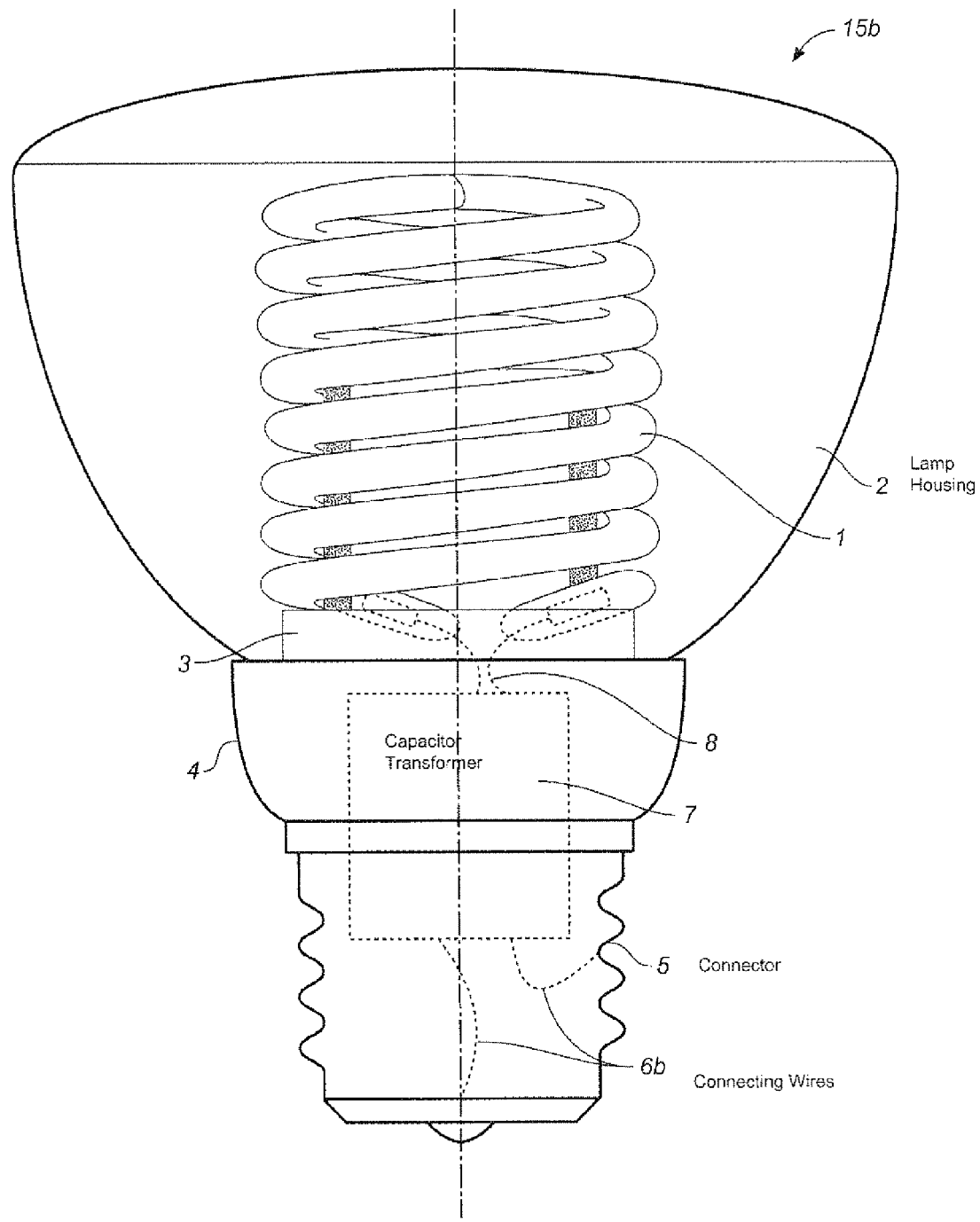
Figure 3C:
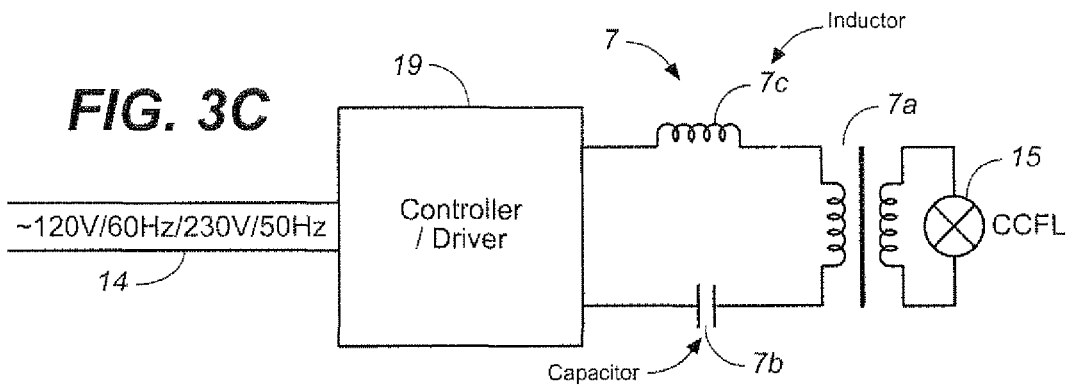
FIG. 3C is a schematic diagram of a circuit in the CCFL lamps of FIGS. 3A and 3B comprising a transformer, a capacitor and an inductor.

FIGS. 3A and 3B are perspective views of two different CCFL lamps with drivers and conventional lamp connectors that may be used to replace incandescent lamps to illustrate the embodiment of FIGS. 1 and 2. As shown in FIG. 3A, CCFL device 15a comprises CCFL 1 with electrodes 1a, lamp support 3, a connector 5 that fits into a conventional socket (not shown) for incandescent lamps to electrically and mechanically connect the CCFL device to the socket, a circuit 7 comprising a capacitor and a transformer (and optionally an inductor) capable for converting AC power having a voltage in the range of about 5 to 400 volts at a frequency in the range of about 1 to 100 kilohertz to an output power suitable for powering a CCFL. CCFL device 15a also includes wires 8 connecting the electrodes 1a at the two ends of the CCFL 1 to the circuit 7. Wires 6b connect the circuit 7 to connector 5 which may be electrically connected to wires 6a of FIG. 2 through the conventional socket. In this manner, the AC power from controller 19 is conveyed to the circuit 7. The transformer in circuit 7 converts this AC power to an output power suitable for powering a CCFL and supplies this output power to electrodes 1a, causing CCFL 1 to emit light. FIG. 3C is a schematic diagram of electronic circuits including driver 19 and circuit 7 in the CCFL lamps of FIGS. 3A and 3B comprising a transformer 7a, a capacitor 7b and an inductor 7c.

FIG. 3B illustrates another design 15b for CCFL device 15, where the device includes a lamp housing 2 not present in CCFL device 15a. With this exception CCFL device 15b is constructed and operates in a manner similar to device 15a. Housing 2 preferably comprises a metallic, plastic, ceramic or glass material that transmits light.

Figure 4:
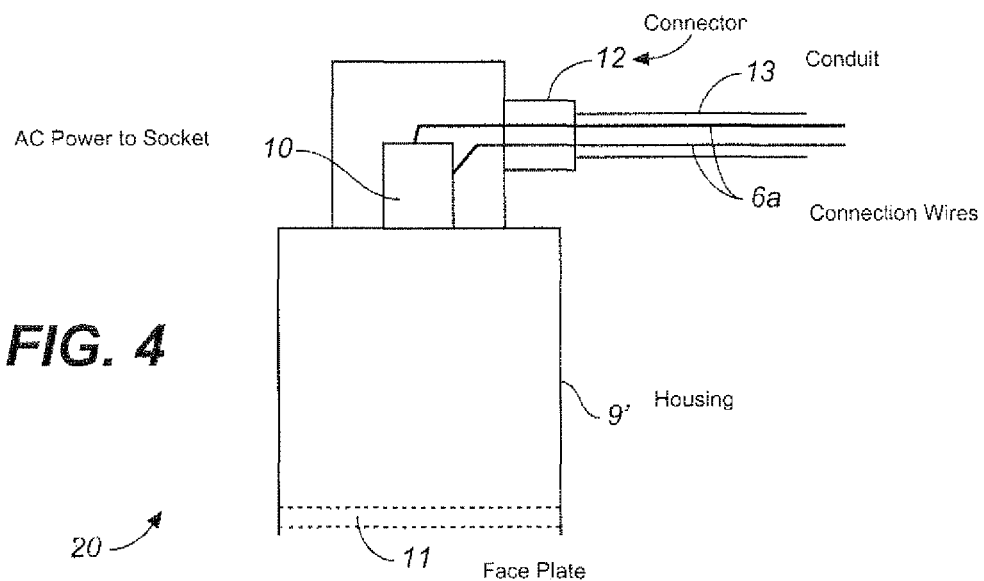
FIG. 4 is a schematic view of a conventional lighting fixture with a conventional lamp socket and connector, and two conduits connected to the fixture to form a lighting circuit, useful for illustrating embodiments of the invention, including those of FIGS. 1-3B.

FIG. 4 is a schematic view of a conventional lighting fixture with a conventional lamp socket and connector, and two conduits which is used to connect the fixture to form a lighting circuit, useful for illustrating embodiments of the invention, including those of FIGS. 1-3B.

The above described schemes for using CCFLs to replace incandescent lamps for use in conventional lighting fixtures work also for replacing HCFLs in conventional lighting fixtures. Thus, illustrated in FIG. 4 is a generalized scheme that can be used for replacing either incandescent lamps or HCFLs in conventional lighting fixtures. As shown in FIG. 4, fixture 20 includes a housing or housing portion 9', a socket 10 designed for mechanical and electrical connection to an incandescent lamp or a HCFL, a connector 12 for housing connection wires 6a in conduit 13 that convey AC power to the socket 10 from controller 19. An optional face plate 11 may also be included.

System 110 illustrated by FIGS. 1-4 above may be arrived at by converting a conventional lighting system designed for use with incandescent lamps or HCFLs. Thus, the fixtures 20 and 20' may simply be ones originally designed for incandescent lamps or HCFLs. The sockets in these figures, such as socket 10 in FIG. 4, are originally designed for incandescent lamps or HCFLs. Instead of installing incandescent lamps or HCFLs in these sockets, CCFL devices such as those of FIGS. 3A and 3B (or CCFL devices with the form factors of HCFLs) may be installed instead. In addition, the switches for controlling the conventional lighting system using incandescent lamps or a HCFLs may be replaced by controller 19 that is capable of converting power from a power source, such as a utility power line, to an AC power having a voltage in the range of about 5-400 volts varying at a frequency in the range of about 1 kc-100 kc. Alternatively, a controller 19 may be installed between the conventional power switch and conduit 13.

Thus, the method for altering a conventional lighting system with a fixture mounted onto a surface of a chamber is very simple. It includes electrically and mechanically connecting a CCFL device to at least one conventional socket supported by the fixture, where the CCFL device comprises a CCFL, a connector that fits into said at least one conventional socket for electrically and mechanically connecting said CCFL to the socket, and a transformer suitable for converting an AC power having a voltage in the range of about 5-400 volts varying at a frequency in the range of about 1 kc-100 kc to an output power suitable for operating the CCFL lamp, causing the CCFL lamp to emit light. It includes installing or connecting a driver or controller to a surface of the chamber, the driver or controller suitable for converting input power from a power source to said AC power; and connecting the driver to the power source for converting input power from the power source to the AC power. If a conventional switch is used to control the conventional lighting system, it will need to be either replaced by the driver or controller, or the driver or controller will need to be installed between the conventional power switch and the CCFL device '1'.

New Lighting System

Where a lighting system is to be installed in a new building or in a remodeling process, or in a simple replacement of an old lighting system, the above designs and process may be further simplified. This is illustrated in FIGS. 5-6.

Figure 5A:
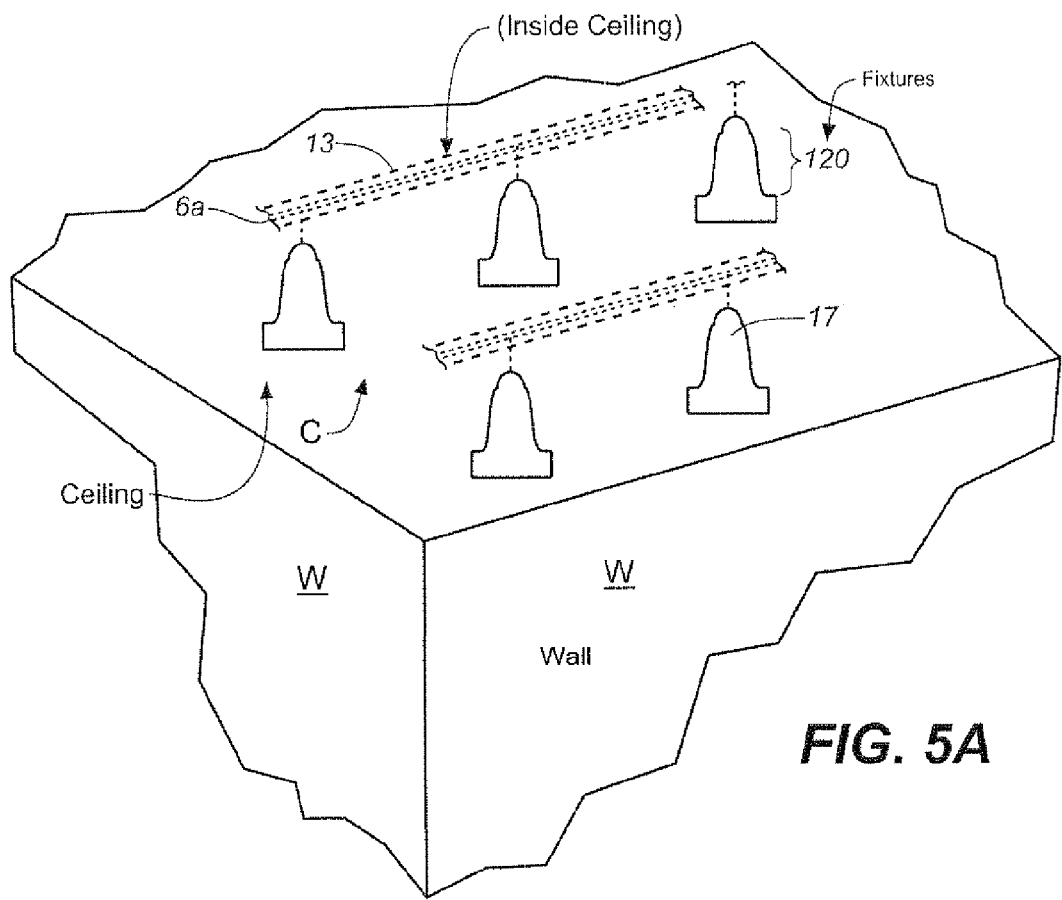
FIG. 5A is a perspective view of a portion of a lighting system where an entirely new lighting system is being installed onto a surface of a chamber in a building to illustrate another embodiment of the invention.
Figure 5B:
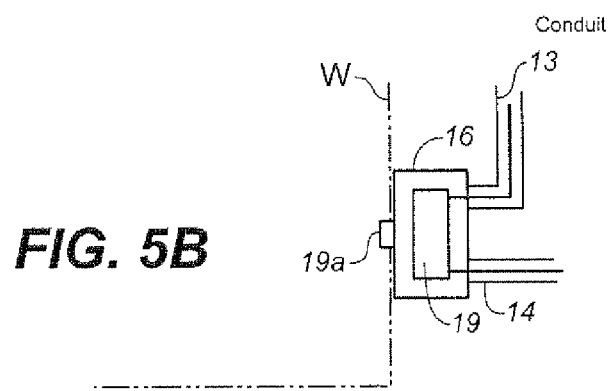
FIG. 5B is a schematic view of another portion of the lighting system of FIG. 5A to illustrate the embodiment of FIG. 5A.

FIG. 5A is a perspective view of a portion of a lighting system comprising five fixtures 120 each containing a CCFL device 17 where an entirely new lighting system is being installed onto a surface of a chamber in a building to illustrate another embodiment of the invention. FIG. 5B is a schematic view of another portion of the lighting system of FIG. 5A to illustrate the embodiment of FIG. 5A. FIG. 6 is a schematic view of a lighting system with a built-in CCFL driver or controller comprising at least one transformer, and preferably an inductor and capacitor, but without a conventional lamp socket for housing an incandescent lamp or HCFL, to illustrate the embodiment of FIG. 5A. The CCFL 1, circuit 7, support 3 and housing 9" are connected (preferably attached together) to form a single unit or unitary structure that can be easily installed, handled and replaced if necessary.

Figure 6:
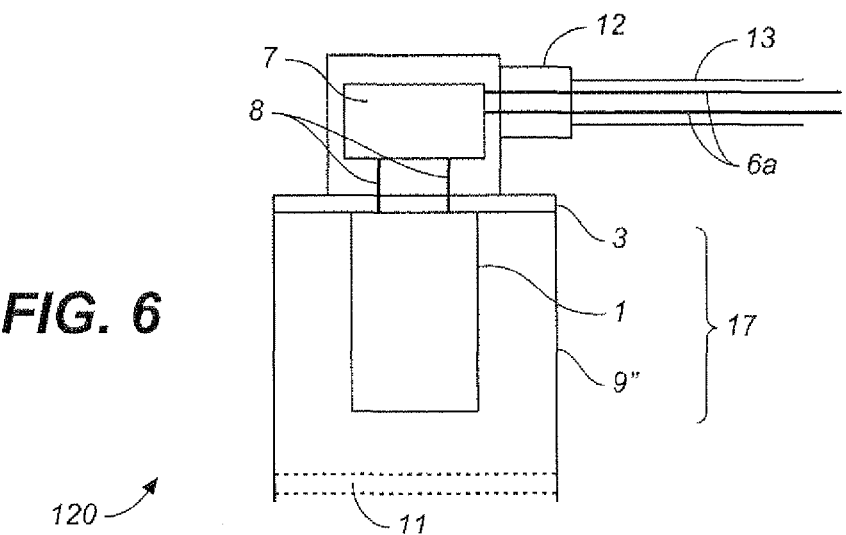
FIG. 6 is a schematic view of a lighting system with a built-in CCFL driver or controller comprising at least one transformer and capacitor without a lamp socket to illustrate the embodiment of FIG. 5A.

The major difference between fixture 120 (holding CCFL device 17) of FIGS. 5A and 6 on one hand and fixture 20 or 20' in FIGS. 1, 2 and 4 on the other is that, unlike fixtures 20 and 20', fixture 120 does not include conventional sockets for the installation of incandescent lamps or HCFLs. Instead, in CCFL device 17, a CCFL 1 may be connected directly to wires 8 which connect the CCFL 1 to circuit 7. CCFL device 17 thus includes CCFL 1, wires 8 and circuit 7. In addition to a transformer, circuit 7 preferably includes an inductor and a capacitor suitable for converting the AC power from controller 19 into power suitable for operating CCFL 1, where the AC power comprises a voltage in the range of about 5-400 volts varying at a frequency in the range of about 1 kc-100 kc. Portions of conduit 13 are shown in broken lines located above ceiling C in FIG. 5A. Fixtures 120 are mounted and hung from the ceiling. While controller 19 is shown as installed behind wall W in FIGS. 1-6, again preferably in a junction box, it will be understood that it may be installed on the same surface of chamber 100 as fixtures 20 and 120, such as the ceiling (or wall W), if desired, such as in the manner shown in FIG. 7 described below.

Figure 7:
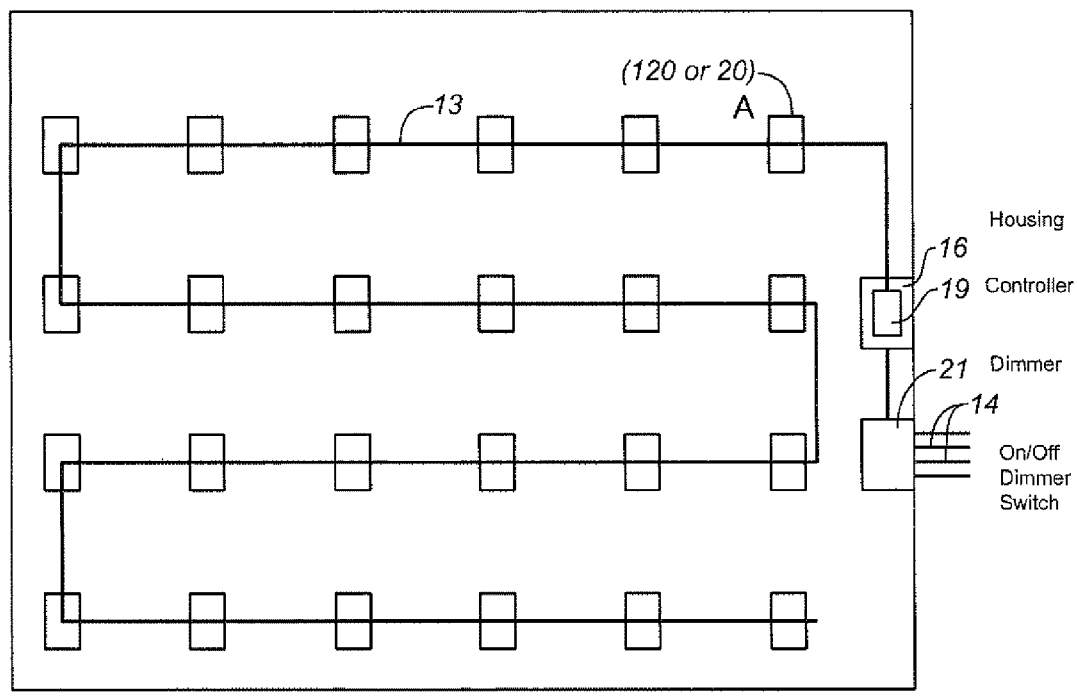
FIG. 7 is a schematic view of a lighting system employing a plurality of CCFL devices controlled by a common CCFL controller and an on/off dimmer/switch to illustrate another embodiment of the invention.

As noted above, controller 19 may be installed between a conventional ON/OFF switch or dimmer and a plurality of CCFL devices. This will allow multiple CCFL devices to be turned on at the same time by flipping one switch or adjusting one dimmer. This is illustrated in FIG. 7, where controller 19 is used to connect ON/OFF switch or dimmer 21 and fixtures 120 or 20 containing CCFL devices connected to one another by conduit 13. By flipping one switch or adjusting one dimmer 21, all of the CCFLs in fixtures 20 or 120 will be turned on or off, or the intensity of light emitted increased or decreased. Lighting fixtures 20 and 120 are adapted to be mounted to chamber surfaces such as the ceiling by means such as hooks or rivets or screws. When controller 19 is used in commercial applications to control a large number of CCFL devices in each lighting circuit, it is preferably capable of converting power in a range of 100 W 2000 W, and controller 19 is preferably installed next to the lighting circuit behind the ceiling or wall. Multiple controllers 19 can be controlled by a single intelligent controller 21, or 121, described in reference to FIG. 8A

Lighting Systems with Multiple Controllers

Figure 8A:
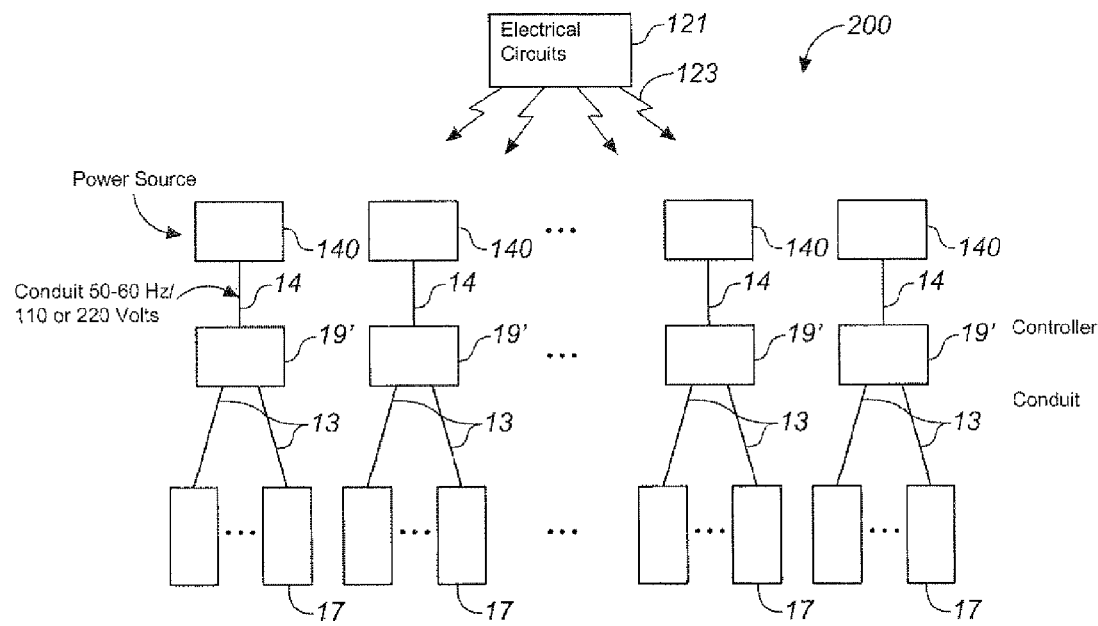
FIG. 8A is a schematic view of a lighting system with multiple controllers and power sources controlling multiple CCFL devices, where the multiple controllers are controlled by another switch or controller to illustrate yet another embodiment of the invention.
Figure 8B:
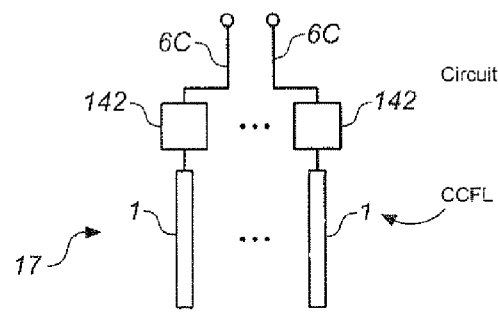
FIG. 8B is a schematic view of an exemplary embodiment of the CCFL devices of FIG. 8A.

To illuminate chambers that cover a large area, such as in commercial or public areas, sometimes a number of electrical circuits each with circuit breakers may be needed. It may be desirable to be able to control the lighting of the large area by a single control device. This single control device may also include light sensors (not shown) that provide outputs. A circuit (not shown) in the control device responds to such outputs and adjusts light intensities of the lighting system in response to different lighting conditions, such as those at different times of the day, or on sunny as opposed to rainy days. FIG. 8A is a schematic view of a lighting system with multiple controllers and power sources controlling multiple CCFL devices, where the multiple controllers are controlled by another switch or controller to illustrate yet another embodiment of the invention. FIG. 8B is a schematic view of an exemplary embodiment of the CCFL devices of FIG. 8A. Lighting system 200 includes four or more electrical circuits each with circuit breakers (not shown). Each circuit includes a power source 140, such as a power outlet connected to utility power lines at 50 or 60 Hz and 110 or 220 volts. A controller 19' is connected to a corresponding power source through a conduit 14. Controller 19', preferably installed next to the lighting circuits behind the ceiling or wall, converts the utility power to the AC power having one or more voltages in the range of about 5-400 volts comprising for example voltage pulses at one or more frequencies in the range of about 1 kc-100 kc, and preferably accommodate power in the range of 100 W~2000 W and supplies these through conduits 13 to each of the plurality of CCFL devices 17. The CCFL devices may form groups or sets, where each set is controlled by a common controller 19' in the same circuit, and supported by one or more lighting fixtures (not shown) in FIG. 8A. Each CCFL device 17 includes at least one CCFL 1 and at least one circuit 142 including a transformer and preferably a capacitor (and optionally an inductor). The transformer in circuit 142 converts the AC power from conduit 13 into an output power suitable for powering and operating CCFLs. Preferably each CCFL device 17 includes a plurality of CCFLs (e.g. two or three) and a plurality of circuits 142 as illustrated in FIG. 8B. The CCFLs in the same CCFL device 17 may be caused to emit light of the same or different color temperature.

The lighting system 200 operates as follows. Each of the controllers 19', preferably installed next to the lighting circuit behind the ceiling or wall, or at any appropriated place with good ventilation for heat dissipation, uses microprocessor based circuitry and operates as an intelligent CCFL controller. Multiple functions or tasks can be pre-programmed into the intelligent CCFL controller, upon receiving a control signal from the main controller 121, which may be operated manually. Controller 19' can perform pre-programmed functions, such as ON, OFF, dimming, adjustment of color temperature, etc. Each of the controllers 19' responds to a signal from a control device 121 to either turn on or off, or to alter the intensity of light emitted by the devices 17. The signal may be conveyed via wires as in embodiments described above or by wireless means 123, such as via microwave or radio waves, or optical signals such as infrared radiation.

In another embodiment, the CCFLs in each of the device 17 may comprise phosphor of different color temperatures, so the color temperature of system 200 is adjustable. In such embodiment, controller 19' is intelligent and can adjust the width of current or voltage pulses applied to the individual CCFLs in each of the devices 17 in response to commands from the control device 121. For example, by using a simple Pulse Width Modulation method to modulate the width of the AC voltage pulses, one can change the intensity of light emitted by the CCFLs. By altering the widths of voltage pulses applied, the intensities of light emitted by the individual CCFLs 1 in each of the CCFL devices 17 may be adjusted. It should be noted that voltage (or current) applied to each of the CCFLs 1 in each CCFL device 17 is controlled by its own corresponding circuit 142. Hence, controller 19' may apply AC voltage pulses, for example, of different widths through different signal lines 6c in each conduit 13 to different circuits 142 in the same CCFL device 17 as illustrated in FIG. 8B. This enables the light intensity emitted by each individual CCFL 1 in each of the CCFL devices 17 to be controlled separately from other CCFLs 1 in the same CCFL device. Where the CCFLs 1 in any one of the CCFL devices have different color temperatures, the above feature also enables the relative light intensities emitted by the CCFLs 1 in such CCFL device to be adjusted, thereby adjusting the overall color temperature of the light emitted by such CCFL device. For example, one CCFL in a CCFL device 17 may have 2700 degrees K phosphors, while another CCFL in such CCFL device may have blue and green phosphors. As another example, a CCFL device 17 may comprise three CCFLs and three corresponding circuits 142, where one of the three CCFLs comprises red phosphor, another one comprises green phosphor, and the last of the three comprises blue phosphor. Obviously the CCFL devices 17 may comprise more than three or fewer than 2 CCFLs and corresponding circuits 142.

Figure 9:
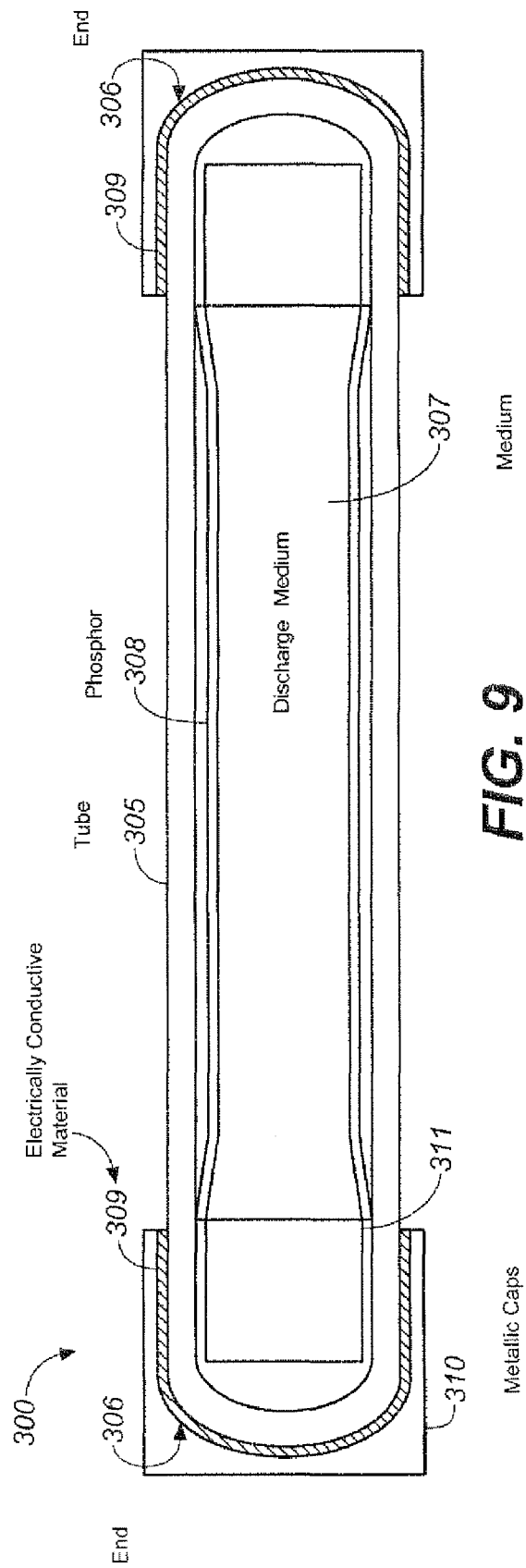
FIG. 9 is a cross-sectional view of a CCFL with no electrodes inside the sealed envelope to illustrate one embodiment of the invention.

One embodiment of the invention is based on the observation that the necessary electric field for operating a CCFL may be applied from electrically conductive members outside the tube or envelope as described in U.S. Pat. No. 6,515,433, which is incorporated herein by reference. This is illustrated in FIG. 9, which is similar to FIG. 12 of U.S. Pat. No. 6,515, 433. As shown in FIG. 9, device 300 comprises a tube or envelope 305 made of a hard or soft glass or quartz, containing a medium 307 that includes a discharge material such as mercury, xenon and one or more inert gasses such as argon, helium, neon or other inert gasses. The tube 305 is vacuum-sealed and contains no electrode inside. Therefore, envelope or tube 305 is much easier and less expensive to make and enables a higher yield in production. Using hard glass or quartz for envelope 305 is particularly advantageous in view of manufacturing considerations.

As shown in FIG. 9, tube or envelope 305 is elongated with two ends 306. Two electrically conductive members comprising two layers 309 are formed on the outside surfaces of the two ends of tube 305, where layer 309 may be made of a silver paste, graphite or other metallic or non-metallic electrically conductive material. Electrically conductive layer 309 may be connected to a driver (not shown) preferably through metallic caps 310. The inside surfaces of tube 305 at the two ends 306 are coated by a protective layer 311 made of a material such as magnesium oxide (MgO), to improve the efficiency in generating secondary electrons, and to reduce the cathode-fall voltage. When suitable power, such as AC power in the range of 1-100 kHz and 100 volts to 100 kilovolts is applied across layers 309, an electric field is applied to the medium 307 in the tube, causing the gas discharge in the medium to generate light for illumination. As noted above, the ultraviolet light so generated would cause the optional fluorescent layer 308 to generate visible light. The AC power applied is coupled to the medium 307 by means of electrically conductive layers 309 through the capacitance between the two layers 309. The value of the capacitance is determined by the areas of layers 309, the thickness and material of tube 305 and the gaseous medium 307. By choosing the appropriate materials and dimensions, it is possible to achieve an appropriate capacitance in order to apply the AC power to the gaseous medium 307 to cause gas discharge. Where it is desirable for device 300 to generate ultraviolet light instead, phosphor layer 308 may be omitted.

While the invention has been described above by reference to various embodiments, it will be understood that changes and modifications may be made without departing from the scope of the invention, which is to be defined only by the appended claims and their equivalents.

What is claimed is:

1. A lighting system for illuminating a chamber with a ceiling and at least one wall comprising:
at least one CCFL device comprising at least one CCFL, at least one transformer, and a circuit between said CCFL and said transformer, wherein said circuit includes at least one capacitor and at least one inductor; at least one lighting fixture mounted onto the ceiling so that light emitted by said at least one CCFL illuminates said chamber, wherein said lighting fixture mechanically supports said at least one CCFL device; wherein said CCFL device and said lighting fixture are integrated to form a unitary structure;
wherein said transformer converts an AC power having a voltage in the range of about 5-400 volts at a frequency in the range of about 1-100 kc to an output power in a range of 2000 to 10,000 volts for operating the at least one CCFL, causing the at least one CCFL to emit light; a driver connected to at least one wall of the chamber and separated from the at least one CCFL device, so that said driver is substantially unaffected adversely by heat generated by the at least one CCFL device, wherein said driver converts input power from a power source to said AC power; and electrical lines located outside said chamber and behind said ceiling and said at least one wall of the chamber connecting said driver to said at least one transformer to supply said AC power from the driver to said at least one transformer.

2. The system of claim 1, further comprising a metal conduit with at least one connector connecting said driver and said at least one transformer, to convey said AC power from said driver to said at least one transformer, said conduit located at least partially behind said ceiling and said at least one wall of the chamber.

3. The system of claim 1, said at least one lighting fixture comprising a conventional socket for a conventional lamp or a hot cathode fluorescent lamp and said at least one CCFL device comprising a connector shaped to be electrically and mechanically connected to said conventional socket of said at least one lighting fixture.

4. The system of claim 1, wherein said at least one lighting fixture comprises no conventional socket for conventional lamps.

5. The system of claim 1, further comprising a conventional lighting controller controlling voltage or current from the power source to the driver.

6. The system of claim 5, wherein said conventional lighting controller includes an on/off switch, dimmer or circuit breaker.

7. The system of claim 1, wherein said output power comprises a voltage in the range of about 2000 to 10,000 volts at a frequency in the range of about 1 kc to 100 kc, and said driver converting power in a range of 100 W to 2000 W.

8. The system of claim 1, further comprising a lighting controller controlling a voltage or current from the power source to the driver by transmitting a signal to the driver, said system comprising a plurality of CCFL devices each comprising at least one CCFL and at least one transformer for converting an AC power having a voltage in the range of about 5-400 volts and a current at a frequency in the range of about 1 kc-100 kc to an output power for operating the at least one CCFL and a plurality of lighting fixtures mounted onto the ceiling of the chamber in the building, each of said plurality of lighting fixtures mechanically supporting one or more of said plurality of CCFL devices when such lighting fixture is mounted onto the ceiling; said system further comprising a plurality of drivers each converting input power from one of a plurality of power sources to said AC power;
wherein said lighting controller controls a voltage or current from each of the power sources to the drivers by transmitting signals to the plurality of drivers to control substantially simultaneously the intensities of light emitted by the plurality of CCFL devices.

9. The system of claim 8, wherein said lighting controller controls a voltage or current from each of the power sources to the drivers by transmitting wireless signals or through wires to the plurality of drivers.

10. The system of claim 1, said driver being connected to the at least one wall of the chamber by means of a junction box behind said at least one wall of the chamber.

11. A lighting system for illuminating a chamber with a ceiling and at least one wall comprising:
a plurality of fixtures mounted onto the ceiling of the chamber; a plurality of CCFL devices, each of said CCFL devices being supported by a corresponding one of said plurality of fixtures, each of the CCFL devices comprising at least one CCFL, at least one transformer, and a circuit between said CCFL and said transformer, wherein said circuit includes at least one capacitor and at least one inductor; wherein each of said CCFL devices and its corresponding lighting fixture are integrated to form a unitary structure; wherein said at least one transformer in each of the CCFL devices converts an AC power having a voltage in the range of about 5-400 volts and a current at a frequency in the range of about 1-100 kc to an output power in a range of 2000 to 10,000 volts for operating said at least one CCFL in such CCFL device, causing the at least one CCFL to emit light to illuminate the chamber; and at least one controller supplying voltages in the range of about 5-400 volts and currents at frequencies in the range of about 1-100 kc to said plurality of CCFL devices, said at least one controller supplying the same or different voltages or currents to the plurality of CCFL devices to provide adjustable lighting by said plurality of CCFL devices; wherein said at least one controller receives power from a power source through an ON/OFF switch;

and wherein said at least one controller is separated from the transformers in the CCFL devices and connected to the at least one wall of the chamber, so that said controller is separated from the plurality of CCFL devices, so that heat generated by said plurality of CCFL devices does not substantially adversely affect said at least one controller; wherein said system further comprises electrical lines located outside said chamber and behind said ceiling and the at least one wall of the chamber, connecting said at least one controller to said at least one transformer in each of the CCFL devices to supply said AC power from said at least one controller to said at least one transformer in each of the CCFL devices.

12. The system of claim 11, said system comprising a plurality of controllers, each of the controllers converting input power from one of a plurality of power sources to said AC power for powering and controlling one or more corresponding sets of the plurality of sets of CCFL devices, each of the controllers supplying different voltages or currents to at least two CCFL devices in at least one of the corresponding sets, said at least two CCFL devices in the at least one corresponding set comprising CCFLs with phosphors of different color temperatures, to provide adjustable color temperature lighting by the at least one corresponding set.

13. The system of claim 12, further comprising a lighting control circuit controlling currents or voltages from the plurality of power sources to the plurality of controllers to control substantially simultaneously the intensities of light emitted by the plurality of sets of CCFL devices.

14. The system of claim 13, wherein said lighting control circuit includes an on/off switch, dimmer or circuit breaker.

15. The system of claim 11, further comprising a manual control device in communication with said at least one controller, for controlling the adjustment of color temperature.

16. The system of claim 15, said manual control device communicating with said at least one controller through a wire, or infrared or radio frequency radiation.

17. The system of claim 11, wherein at least one CCFL in a first one of said two CCFL devices in at least one of the sets comprises 2700 K° phosphor and at least one CCFL in a second one of said two CCFL devices in such one set comprises a mixture of blue and green phosphor.

18. The system of claim 11, wherein at least one of the sets includes at least a first, second and third CCFL device, the first CCFL device comprising a CCFL with red phosphor, the second CCFL device comprising a CCFL with green phosphor, and the third CCFL device comprising a CCFL with blue phosphor, said at least one controller supplying the AC power separately to said at least first, second and third CCFL devices to control individually the brightness of red, green and blue light generated by the at least first, second and third CCFL devices.

19. A method for altering a lighting system for illuminating a chamber in a building, said chamber having a ceiling and at least one wall, said lighting system comprising at least one lighting fixture mounted onto the ceiling of the chamber in the building, said at least one lighting fixture including at least one conventional socket for a conventional lamp, said lighting system further comprising electrical lines and a controller controlling a current supplied to the at least one conventional socket through said electrical lines; said method comprising:

electrically and mechanically connecting to said at least one conventional socket a CCFL device in place of said conventional lamp, said CCFL device comprising a CCFL, a connector that fits into said at least one conventional socket for electrically and mechanically connecting said CCFL to the socket, at least one transformer, and a circuit between said CCFL and said transformer, wherein said circuit includes at least one capacitor and at least one inductor; wherein said lighting fixture mechanically supports said at least one CCFL device; wherein said CCFL device and said lighting fixture are integrated to form a unitary structure; wherein said transformer converts an AC power having a voltage in the range of about 5-400 volts and a current at a frequency in the range of about 1-100 kc to an output power for operating the CCFL lamp, causing the CCFL lamp to emit light; and removing said controller and replacing said controller by installing a driver to the at least one wall of the chamber away from the CCFL device, so that said driver is substantially unaffected adversely by heat generated by the CCFL device, wherein said driver converts input power from a power source to said AC power and supplying said AC power to said at least one transformer through said electrical lines; and connecting said driver to the power source for converting input power from the power source to said AC power.

20. The method of claim 19, further comprising removing said controller.

21. The method of claim 20, wherein said installing and removing include connecting said driver to said electrical lines so that the driver is in a circuit path between said power source and said at least one conventional socket.

22. A method for illuminating a chamber in a building with a lighting system, said chamber defined by a ceiling and at least one wall, wherein said lighting system comprises at least one CCFL device; wherein said at least one CCFL device comprises at least one CCFL, at least one transformer, and a circuit between said CCFL and said transformer, wherein said circuit includes at least one capacitor and at least one inductor; at least one lighting fixture mounted onto the ceiling so that light emitted by said at least one CCFL illuminates said chamber, wherein said at least one lighting fixture mechanically supports said at least one CCFL device; wherein said CCFL device and said lighting fixture are integrated to form a unitary structure; said method comprising:

connecting a driver to the at least one wall of the chamber, so that said driver is separated from the at least one transformer and substantially unaffected adversely by heat generated by the at least one CCFL device; causing said driver to convert input power from a power source to an AC power in the range of about 5-400 volts and at a frequency in the range of about 1-100 kc;

and supplying said AC power from said driver to said at least one transformer by means of an electrical line outside said chamber behind said ceiling and at least one wall of the chamber, and causing said at least one transformer to convert said AC power to an output power in a range of 2000 to 10,000 volts for operating the at least one CCFL, causing the CCFL to emit light for illuminating the chamber.

23. The method of claim 22, said causing of said driver to convert input power from a power source to an AC power in the range of about 5-400 volts and at a frequency in the range of about 1 kc-100 kc including transmitting a signal to said driver.

24. The method of claim 23, wherein said transmitting transmits a wireless signal.

25. The method of claim 22, wherein said connecting mounts the driver by means of a power junction box to the at least one wall of the chamber 26. A method for illuminating a chamber in a building, said chamber defined by a ceiling and at least one wall, wherein mounted onto the ceiling are a plurality of fixtures supporting a plurality of sets of CCFL devices, each set including at least two CCFL devices, the at least two CCFL devices in each set comprise CCFLs with phosphors of different color temperatures, each of said sets of CCFL devices being mechanically supported by a corresponding one of said plurality of fixtures, each of the CCFL devices comprising at least one CCFL, at least one transformer, and a circuit between said CCFL and said transformer, wherein said circuit includes at least one capacitor and at least one inductor; wherein each set of said CCFL devices and one of said plurality of lighting fixtures supporting such set are integrated to form a unitary structure; said method comprising:

converting input power from a power source to AC power by means of at least one driver mounted onto the at least one wall, said AC power comprising one or more voltages in the range of about 5-400 volts and one or more currents at a frequency or frequencies in the range of about 1-100 kc, said at least one driver separated from the at least one transformer in each of the CCFL devices, so that said at least one driver is substantially unaffected adversely by heat generated by each of the CCFL devices; and supplying said AC power from said at least one driver, by means of electrical lines outside said chamber behind said ceiling and at least one wall of the chamber, separately to said at least one transformer in each of at least two CCFL devices in at least one of the plurality of sets of CCFL devices, so that voltages or currents are supplied separately to said at least two CCFL devices in at least one of the plurality of sets of CCFL devices; wherein said at least one transformer in each of the at least two CCFL devices in at least one of the plurality of sets of CCFL devices converts said AC power to an output power in a range of 2000 to 10,000 volts for operating such CCFL device, causing such CCFL device to emit light; and controlling separately voltages or currents supplied to the at least two CCFL devices in such at least one set of CCFL device to provide adjustable color temperature lighting.

27. The method of claim 26, wherein said controlling is by means of an intelligent controller.

28. The method of claim 26, wherein said controlling is by means of a signal sent through a wire, or by means of an infrared or radio frequency radiation signal to said at least one driver.

* * * * *